United States Patent
Matsumoto

(10) Patent No.: US 8,050,209 B2
(45) Date of Patent: Nov. 1, 2011

(54) GROUP COMMUNICATION METHOD, COMMUNICATION DEVICE AND MANAGEMENT DEVICE

(75) Inventor: Yuji Matsumoto, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 270 days.

(21) Appl. No.: 11/329,483

(22) Filed: Jan. 10, 2006

(65) Prior Publication Data

US 2007/0076698 A1    Apr. 5, 2007

(30) Foreign Application Priority Data

Sep. 30, 2005   (JP) ................................. 2005-286369

(51) Int. Cl.
*H04H 20/71*    (2008.01)
(52) U.S. Cl. ........ 370/312; 370/432; 370/260; 370/261; 370/262; 370/263; 370/474; 370/475; 455/502; 455/501; 455/518; 455/519
(58) Field of Classification Search .................. 455/502, 455/501, 518, 519; 370/432, 312, 260–263, 370/474–475
See application file for complete search history.

(56) References Cited

U.S. PATENT DOCUMENTS

| | | | |
|---|---|---|---|
| 6,240,188 B1* | 5/2001 | Dondeti et al. ............. | 380/284 |
| 7,301,946 B2* | 11/2007 | Meier et al. ................. | 370/390 |
| 2002/0106985 A1 | 8/2002 | Sato et al. | |
| 2002/0178235 A1 | 11/2002 | Ueno et al. | |
| 2003/0232626 A1* | 12/2003 | Hill et al. .................. | 455/519 |
| 2004/0017809 A1* | 1/2004 | Park .......................... | 370/390 |
| 2004/0180681 A1* | 9/2004 | Jeong et al. ................ | 455/503 |
| 2005/0009545 A1* | 1/2005 | Axelsson et al. .......... | 455/502 |
| 2005/0030966 A1* | 2/2005 | Cai et al. .................... | 370/432 |
| 2005/0076369 A1* | 4/2005 | Cai et al. .................... | 725/62 |

FOREIGN PATENT DOCUMENTS

| | | |
|---|---|---|
| JP | 8-065237 A | 3/1996 |
| JP | 2001-308856 | 11/2001 |
| JP | 2002-051006 | 2/2002 |
| JP | 2002-335281 | 11/2002 |
| JP | 2002-368751 A | 12/2002 |
| JP | 2002-369233 | 12/2002 |
| JP | 2003-134161 | 5/2003 |

OTHER PUBLICATIONS

"Japanese Office Action", mailed by JPO and corresponding to Japanese application No. 2005-286369 on Mar. 23, 2010, with partial English translation.
Japan Patent Office, Office Action mailed Jul. 27, 2010, in connection with correspondent JP patent application No. 2005-286369; English-language partial translation.

* cited by examiner

*Primary Examiner* — Kwasi Karikari
(74) *Attorney, Agent, or Firm* — Fujitsu Patent Center

(57) ABSTRACT

A group communication method capable of performing group communication without additional functions provided on a network and with preventing excessive network traffic. Each communication device first transmits an enrollment message. A providing device groups the communication devices, creates a group key specifying the communication devices that are identified as a same subgroup, and transmits the group key to the communication devices. The communication devices receive and store the group key. To transmit distribution data to a subgroup, the providing device transmits the data together with data corresponding to the group key to a selected communication device of the subgroup. When the communication devices recognize the distribution data, the communication devices determine whether to receive the distribution data, based on the distribution data and the stored group key.

15 Claims, 10 Drawing Sheets

GROUP COMMUNICATION METHOD, COMMUNICATION DEVICE AND MANAGEMENT DEVICE

CROSS-REFERENCE TO RELATED APPLICATIONS

This application is based upon and claims the benefits of priority from the prior Japanese Patent Application No. 2005-286369, filed on Sep. 30, 2005, the entire contents of which are incorporated herein by reference.

BACKGROUND OF THE INVENTION (1) Field of the Invention

This invention relates to a group communication method, a communication device and a management device, and more particularly, to a group communication method, a communication device and a management device for group communication.

(2) Description of the Related Art

IP multicast communication has been widely known as a technique to simultaneously transmit the same data to a plurality of receiving ends.

For the IP multicast communication, a method where a server selects a multicast group comprising member terminals and transmits data to the group has been proposed (for example, Japanese Patent Application Laid-open No. 2003-134161).

As another technique to simultaneously transmit the same data to a plurality of receiving ends, Push-to-Talk communication has been known, which realizes group communication by half duplex communication.

In the IP multicast communication, a multicast distribution tree is constructed and then multicast data is transmitted. As to the multicast distribution tree, multicast routers are used as routers and connected by unicast between them.

In the Push-to-Talk communication, data is transmitted to the member terminals of a group by unicast.

The above IP multicast service, however, has a drawback in that a network is not easily built because special routers and a unique protocol should be provided on the network.

The Push-to-Talk communication, on the other hand, can realize the service, irrespective of network. However, the unicast communication may cause excessive network traffic when the number of member terminals increases in the group.

SUMMARY OF THE INVENTION

This invention has been made in view of foregoing and intends to provide a group communication method, a communication device and a management device capable of realizing group communication without special functions provided on a network and with preventing excess network traffic.

To accomplish the above objects, there provided is a group communication method for performing broadcast communication in a group comprising communication devices by using a management device that manages the group. According to this group communication method, each communication device first transmits an enrollment message to join the group. Then the management device groups the communication devices transmitting the enrollment message, creates a group key specifying the communication devices that are identified as a same subgroup, transmits the group key to the communication devices of the same subgroup. Then the communication devices receive and store the group key. To transmit distribution data to a subgroup, the management device selects at least one communication device of the subgroup and transmits the distribution data together with data corresponding to the group key to the selected communication device(s) of the subgroup. When the communication devices recognize the distribution data, the devices determine based on the distribution data and the group key being stored whether to receive the distribution data.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 1 is a principle view of a group communication system according to this invention.

FIG. 2 shows a group communication system according to the first embodiment.

FIG. 3 is a block diagram of a providing device.

FIG. 4 is a block diagram of a communication device.

FIGS. 5 and 6 are a flowchart showing operation of the providing device.

FIG. 7 is a flowchart of a packet reception process of the communication device.

FIG. 8 shows an example of operation of the group communication system.

FIG. 9 shows a multicast logical group key for the group communication system of FIG. 8.

FIG. 10 shows a group communication system according to the second embodiment.

DESCRIPTION OF THE PREFERRED EMBODIMENTS

Preferred embodiments of this invention will be described with reference to the accompanying drawings.

The present invention that is implemented to the embodiments will be first summarized and then the specific embodiments will be described.

FIG. 1 is a principle view of a group communication system of this invention.

A group communication system 100 has communication devices 1 and 2, a providing device 3, an access point (AP) 4, and an access network 5.

The communication devices 1 and 2 communicate with the providing device 3 via the AP 4 and the access network 5.

To join a group, the communication devices 1 and 2 first transmit enrollment messages Msg1 and Msg2 to the providing device 3.

The providing device 3 has a management table Tbl1 for managing communication devices 1 and 2, the management table Tbl1 containing information included in enrollment messages. Referring to this figure, the management table Tbl1 contains group information and subgroup (logical group) information regarding the communication devices 1 and 2. When the communication devices 1 and 2 join the same group and their IP addresses indicate the same AP (AP 4 in FIG. 1), the providing device 3 identifies them as belonging to the same subgroup (logical group), and creates (defines) a group key so that the communication devices 1 and 2 can receive the same data. Then, the providing device 3 transmits (makes a notice of) a multicast logical group keys K1 and K2 each including the group key to the communication devices 1 and 2, respectively. This multicast logical group key will be described later.

Figure 1:
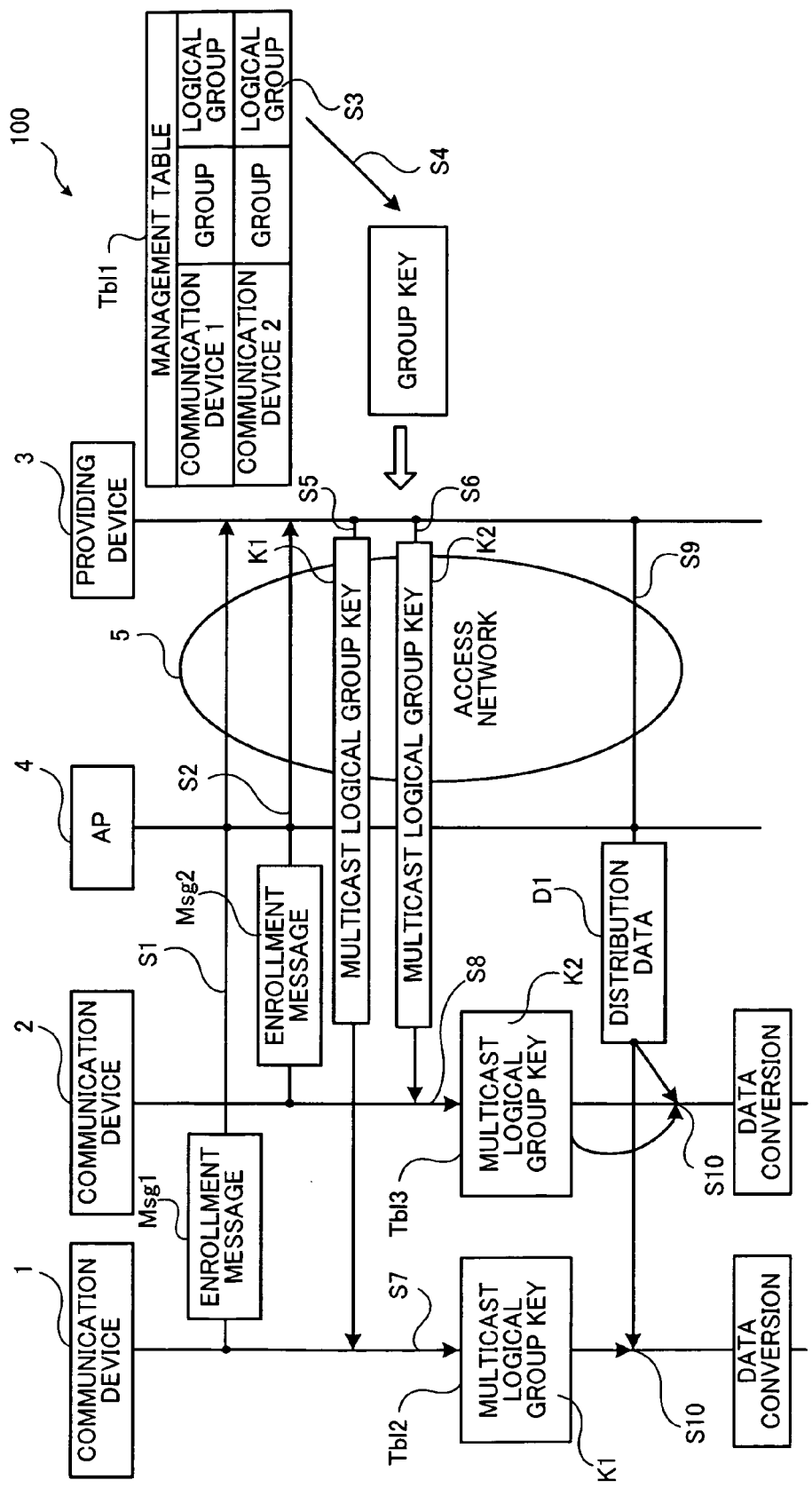

The communication devices 1 and 2 have management tables Tbl2 and Tbl3 to store the received multicast logical group keys K1 and K2.

Under this condition, assume that the providing device 3 selects the communication device 1 of the subgroup (comprising the communication devices 1 and 2) as a destination and transmits distribution data D1 to the communication device 1. The communication device 1 recognizes the distribution data D1, and receives the data after confirming the destination. The communication device 2 also recognizes the distribution data D1, and determines based on the group key whether to receive the distribution data D1. When it is recognized that the distribution data D1 is logically-created multicast distribution data, the communication device 2 receives this data. At this time, the communication device 2 performs address conversion (rewriting) based on the multicast logical group key K2 being stored in the management table Tbl3.

The group communication system 100 works as follows.

First the communication devices 1 and 2 transmit enrollment messages Msg1 and Msg2 to the providing device 3 (steps S1 and S2).

When it is detected that the communication devices 1 and 2 join the same group and their IP addresses indicate the same AP 4, the providing device 3 identifies the communication devices 1 and 2 as belonging to the same subgroup (logical group) (step S3), and creates (defines) a group key for the communication devices 1 and 2 (step S4). The providing device 3 transmits (makes a notice of) multicast logical group keys K1 and K2 each including the group key to the communication devices 1 and 2, respectively (steps S5 and S6).

The communication devices 1 and 2 receive and store the multicast logical group keys K1 and K2 into the management tables Tbl2 and Tbl3 (step S7, S8).

Then, the providing device 3 selects the communication device 1 as a destination and transmits distribution data D1 (step S9). The communication device 1 recognizes the distribution data D1, and receives this data D1 after confirming the destination. At this time, the communication device 2 also recognizes the distribution data D1 and determines based on the group key whether the distribution data D1 is logically-created multicast distribution data. When this determination results in Yes, the communication device 2 receives this distribution data D1 (step S10). At this time, the communication device 2 performs the address conversion based on the multicast logical group key K2 being stored in the management table Tbl3.

Specific embodiments of this invention will be hereinafter described in detail.

Figure 2:
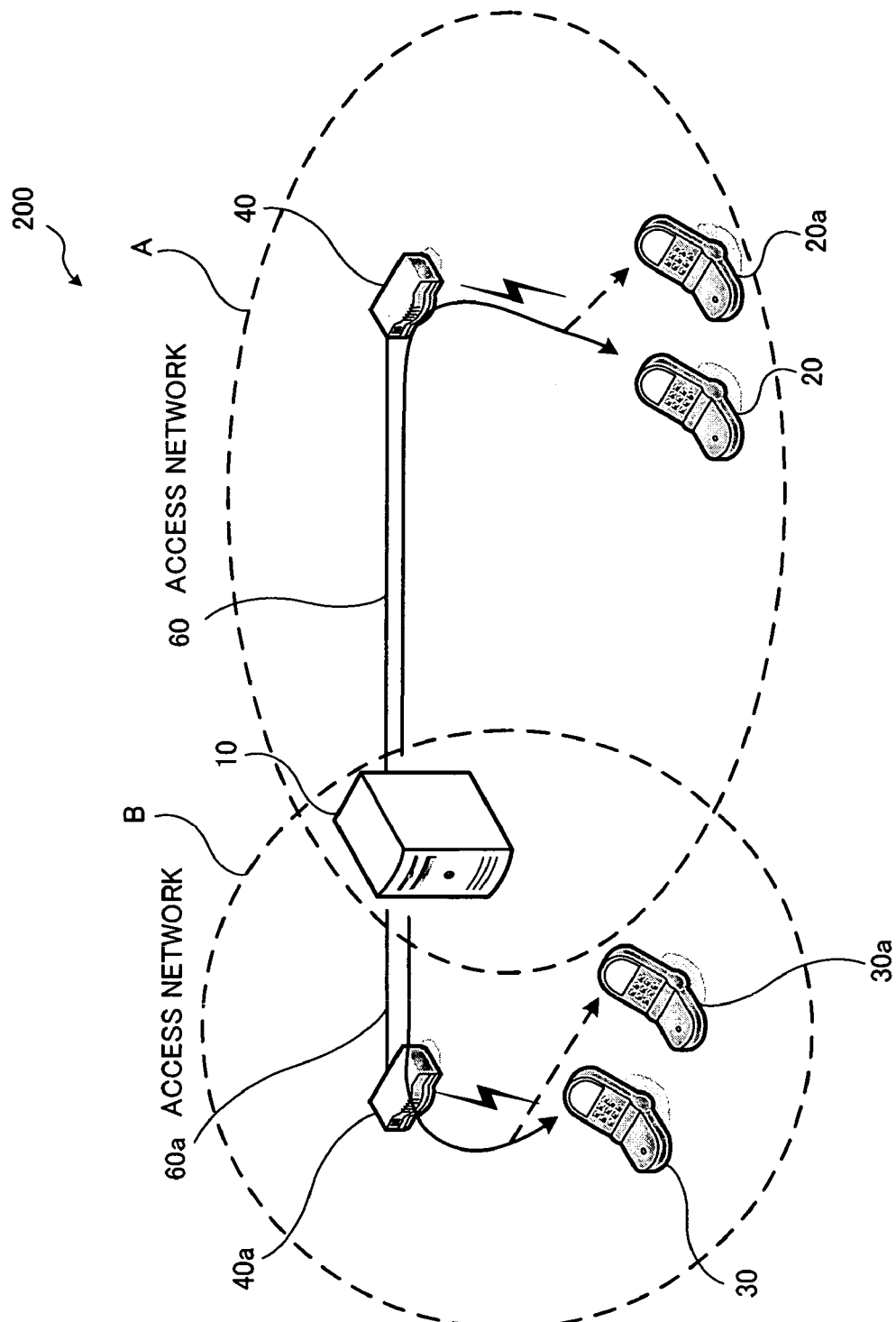

FIG. 2 shows a group communication system according to the first embodiment.

Referring to this figure, a group communication system 200 has a group including subgroups A and B, the subgroup A comprising a providing device 10, communication devices 20 and 20*a*, an AP 40, and an access network 60, the subgroup B comprising the providing device 10, communication devices 30 and 30*a*, an AP 40*a*, and an access network 60*a*.

The providing device 10 manages both the subgroups A and B. In a case of broadcast communication in the group, the providing device 10 transmits data together with information equivalent to a multicast address, to a main device, for example, the communication device 20, 30 of each subgroup. At this time, the communication device 20*a*, 30*a* also recognizes this data, and receives the data when detecting that this data is broadcast data.

By the way, in the group communication system 200, the communication devices 20, 20*a*, 30, 30*a* are grouped into the subgroups A and B by an initial operation. This initial operation will be described later.

Next explanation is about how to realize such the group communication system 200. The following explanation uses the subgroup A as an example. The subgroup B has the same configuration as the subgroup A.

Figure 3:
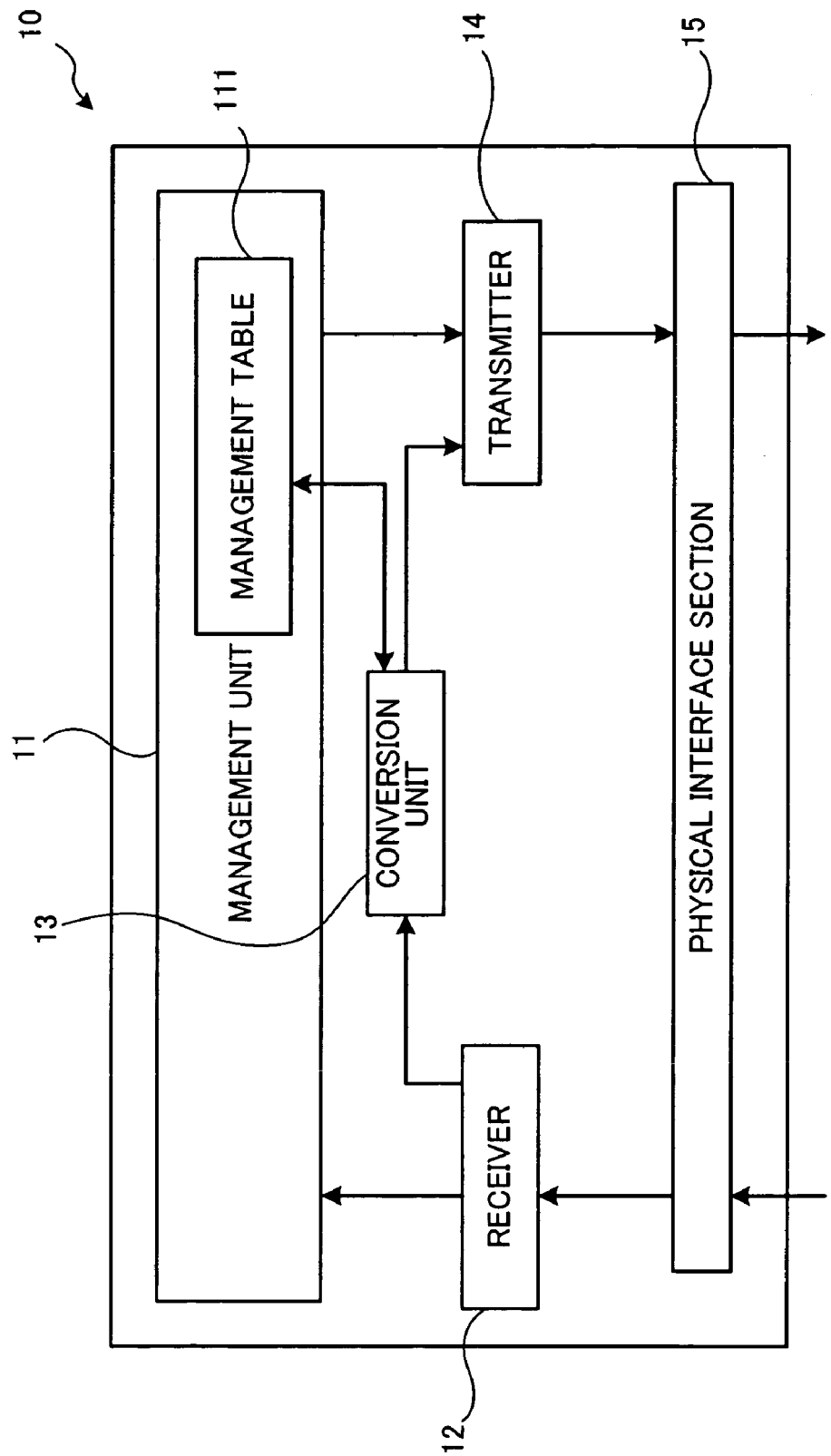

FIG. 3 is a block diagram of the providing device.

The providing device 10 has a management unit 11, a receiver 12, a conversion unit 13, a transmitter 14, and a physical interface section 15 for data input/output.

The management unit 11 processes data which are input/output via the physical interface section 15. Further, the management unit 11 has a management table 111 for storing (registering) information on the communication devices 20 and 20*a* transmitting enrollment messages. Furthermore, the management unit 11 manages the stored information on the communication devices 20 and 20*a*. When detecting that the communication devices 20 and 20*a* can be grouped, the management unit 11 creates a logical key (group key) and then a multicast logical group key including the logical key, and gives it to the transmitter 14.

The receiver 12 receives enrollment messages and packets from communication devices via the physical interface section 15.

When the receiver 12 receives from the communication device 20 a data delivery request to another communication device of the subgroup A, or the communication device 20*a*, the conversion unit 13 converts the data based on the logical key and the information on the communication device 20*a* being stored in the management table 111, and gives the converted data to the transmitter 14 (the same process is performed on a data delivery request to the communication device 20, from the communication device 20*a*).

The transmitter 14 transmits the received data via the physical interface section 15.

Figure 4:
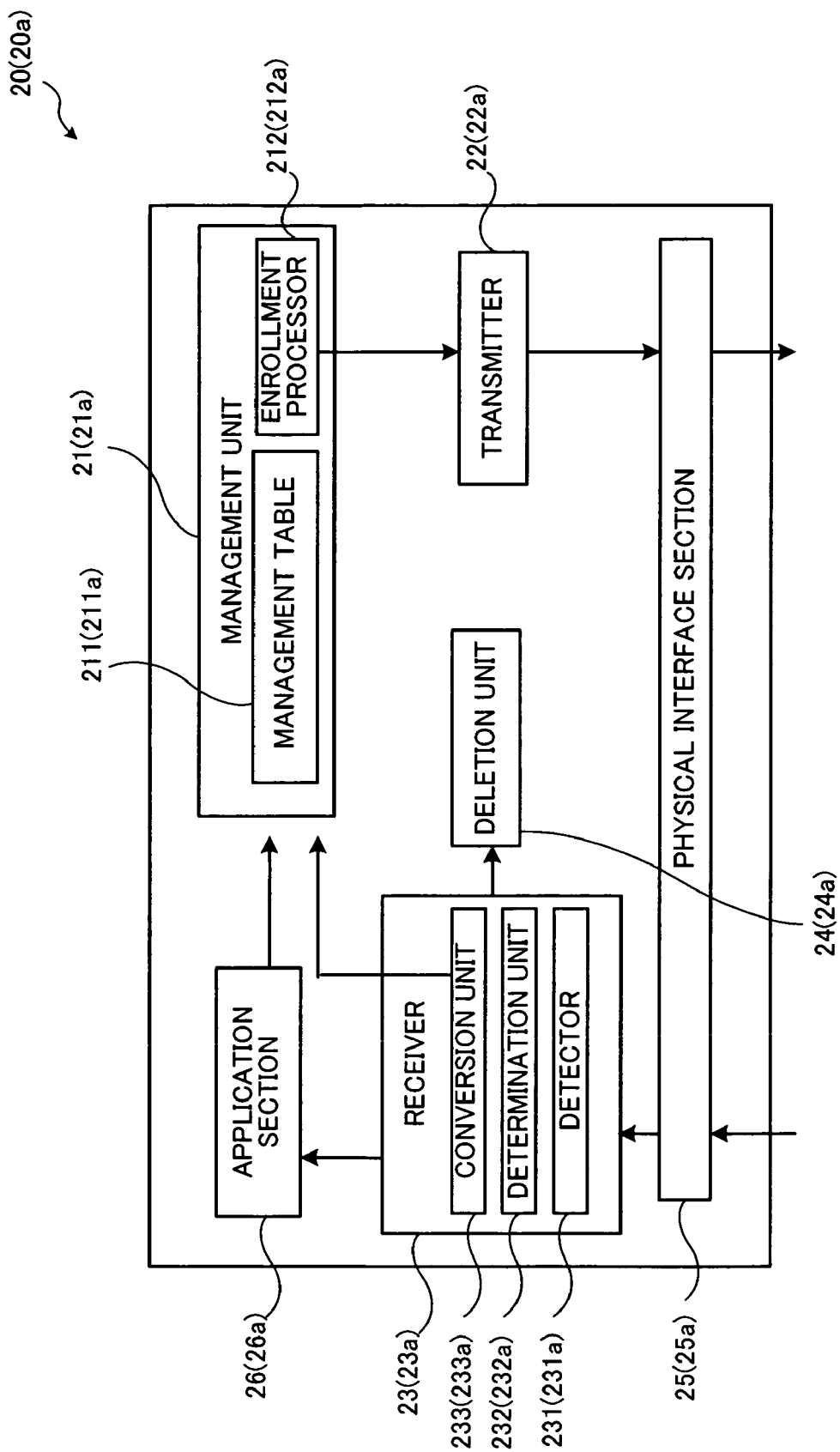

FIG. 4 is a block diagram of a communication device.

The communication device 20 will be described as an example. It should be noted that the communication device 20*a* has the same configuration. This figure shows the reference numbers of the both devices.

The communication device 20 has a management unit 21, a transmitter 22, a receiver 23, a deletion unit 24, a physical interface section 25, and an application section 26.

The management unit 21 has a management table 211 for storing a multicast logical group key and an enrollment processor 212 for transmitting an enrollment message to the providing device 10. To transmit an enrollment message, the enrollment processor 212 instructs the transmitter 22, which then transmits the enrollment message to the providing device 10 via the physical interface section 25 in response to the instruction.

The receiver 23 has functions to receive and process data via the physical interface section 25. Specifically, the receiver 23 has a detector 231, a determination unit 232 and a conversion unit 233. The detector 231 detects data coming via the physical interface section 25. The determination unit 232 determines based on information being stored in the management table 211 whether to receive data detected by the detector 231. The conversion unit 233 converts the data to be received according to a mode specified in the management table 211 and gives the converted data to the management unit 21.

The deletion unit 24 deletes data that the determination unit 232 identifies as unnecessary to receive.

Figure 5:
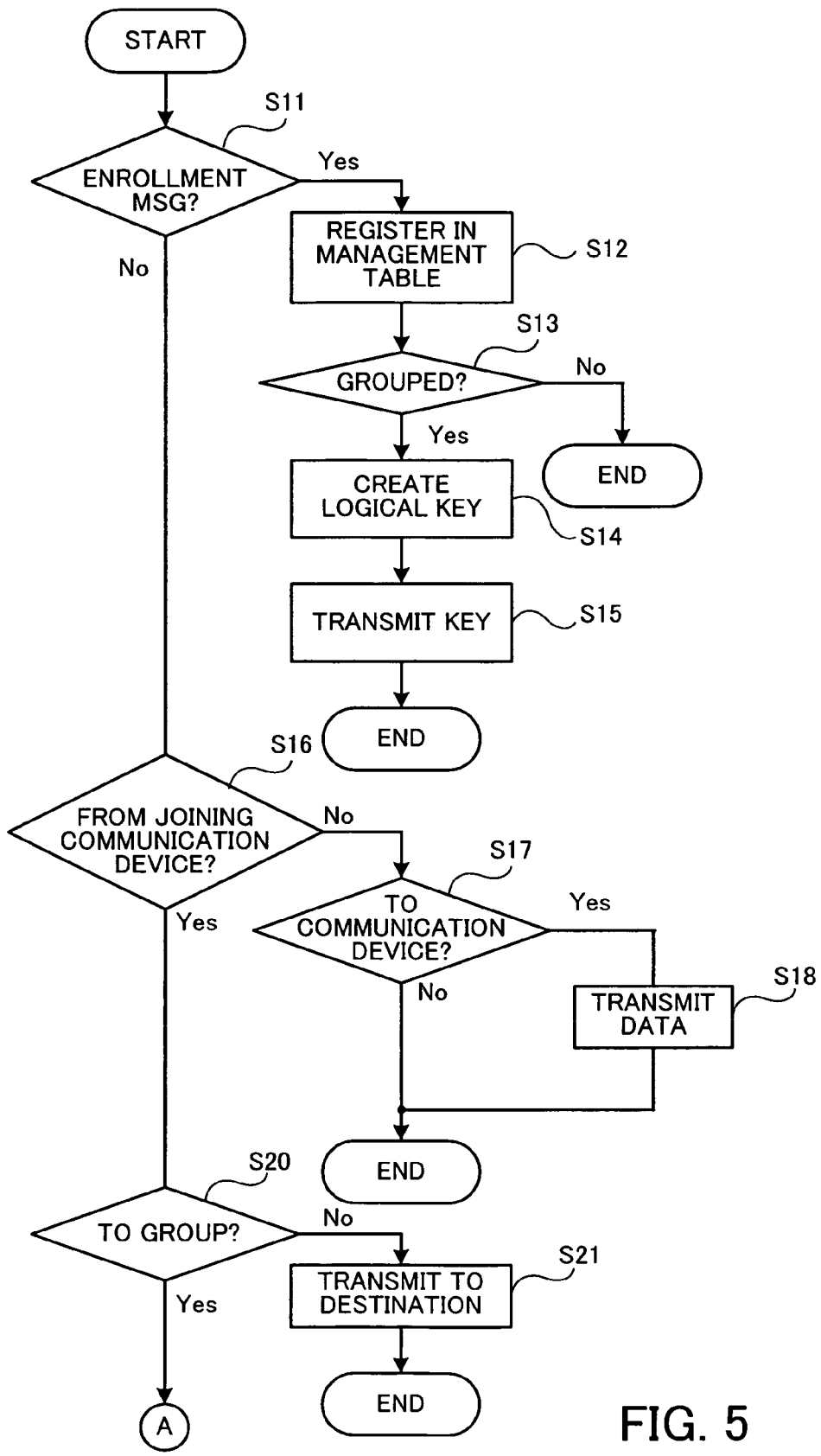
Figure 6:
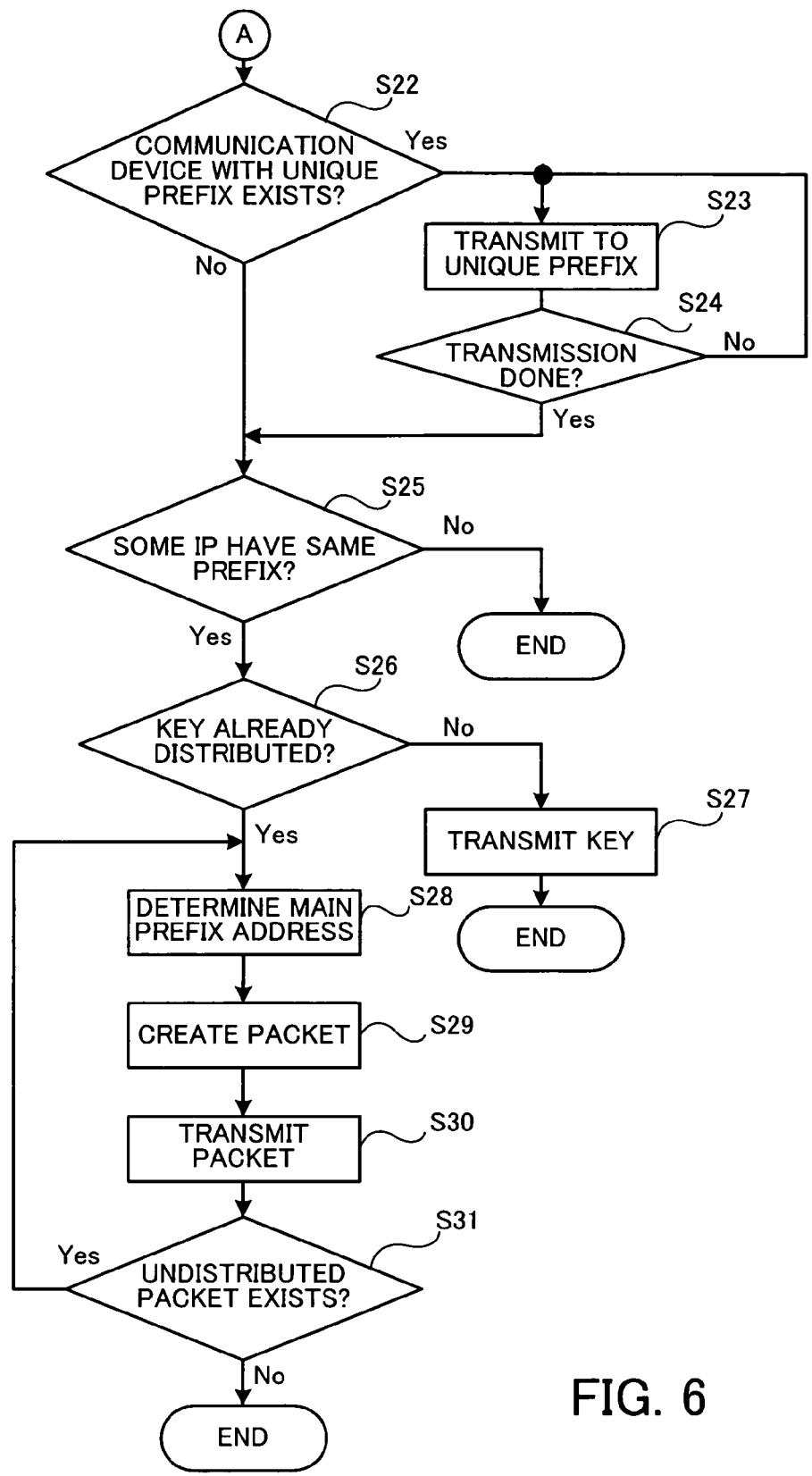

The operation of the group communication system 200 will be now described. FIGS. 5 and 6 show the operation of the providing device.

<Initial Operation>

In this initial operation, the communication devices are grouped into the subgroups. As an example, a case where the communication device 20 is grouped into the subgroup A will be described. FIGS. 5 and 6 are a flowchart showing the operation of the providing device.

At first, the communication device 20 transmits an enrollment message to the providing device 10 to join a group.

The providing device 10 determines whether a received message is an enrollment message (step S11). When this determination in step S11 results in Yes, the providing device 10 starts this operation. Specifically, the providing device 10 receives and registers this message in the management table 111 (step S12). Then the providing device 10 determines whether some communication devices exist in the group and some IP addresses have the same prefix as the IP address of the communication device 20 (step S13). When this determination in step S13 results in No, the providing device 10 ends this operation. When the determination in step S13 results in Yes, on the contrary, the management unit 11 creates a logical key (step S14), transmits this key to the communication device 20 (step S15), and ends this initial operation. The communication device 20 stores this logical key in the management table 111.

When the determination in step S11 results in No, the providing device 10 determines whether the message came from another communication device (hereinafter, referred to as joining communication device) belonging to the group (step S16). When this determination in step S16 results in No, the providing device 10 then determines whether the received data is addressed to the communication device 20 or 20*a* (step S17). When this determination in step S17 results in Yes, the providing device 10 transmits the data (step S18) and ends this operation. When the determination in step S17 results in No, the providing device 10 ends this operation without receiving the message.

When the determination in step S16 results in Yes, the providing device 10 determines whether the message is addressed to the subgroup A (step S20). When this determination in step S20 results in No, the providing device 10 transmits the message to the designated destination (step S21) and ends this operation. When the determination in step S20 results in Yes, the providing device 10 searches for a communication device with a unique prefix (step S22). When a communication device with a unique prefix exists (Yes of step S22), the providing device 10 transmits the message to the found communication device (step S23). Then it is determined whether transmission to all communication devices each having a unique prefix is done (step S24). When this determination in step S24 results in No, the providing device 10 goes back to step S23 to continue the transmission. When the determination in step S24 results in Yes, the process goes on to step S25.

When a communication device having a unique prefix is not detected in step S22 (No of step S22), the providing device 10 determines whether some IP addresses have the same prefix (step S25). When this determination in step S25 results in No, the providing device 10 ends this operation. When the determination in step S25 results in Yes, the providing device 10 determines whether a multicast logical group key has been distributed (step S26). When this determination in step S26 results in No, the providing device 10 distributes the key to the intended devices (step S27) and ends this operation. When the determination in step S26 results in Yes, the providing device 10 operates for group communication.

<Group Communication Operation>

In the group communication operation, the providing device 10 determines a main prefix address (step S28). Then the providing device 10 creates a packet (distribution data) that is addressed to the main prefix address (step S29), and transmits the created packet to the main prefix address (step S30). Then, it is determined whether there is a different prefix to which the packet is not transmitted (step S31). When this determination in step S31 results in Yes, the process goes back to step S28. When the determination in step S31 results in No, the providing device 10 ends this operation.

Figure 7:
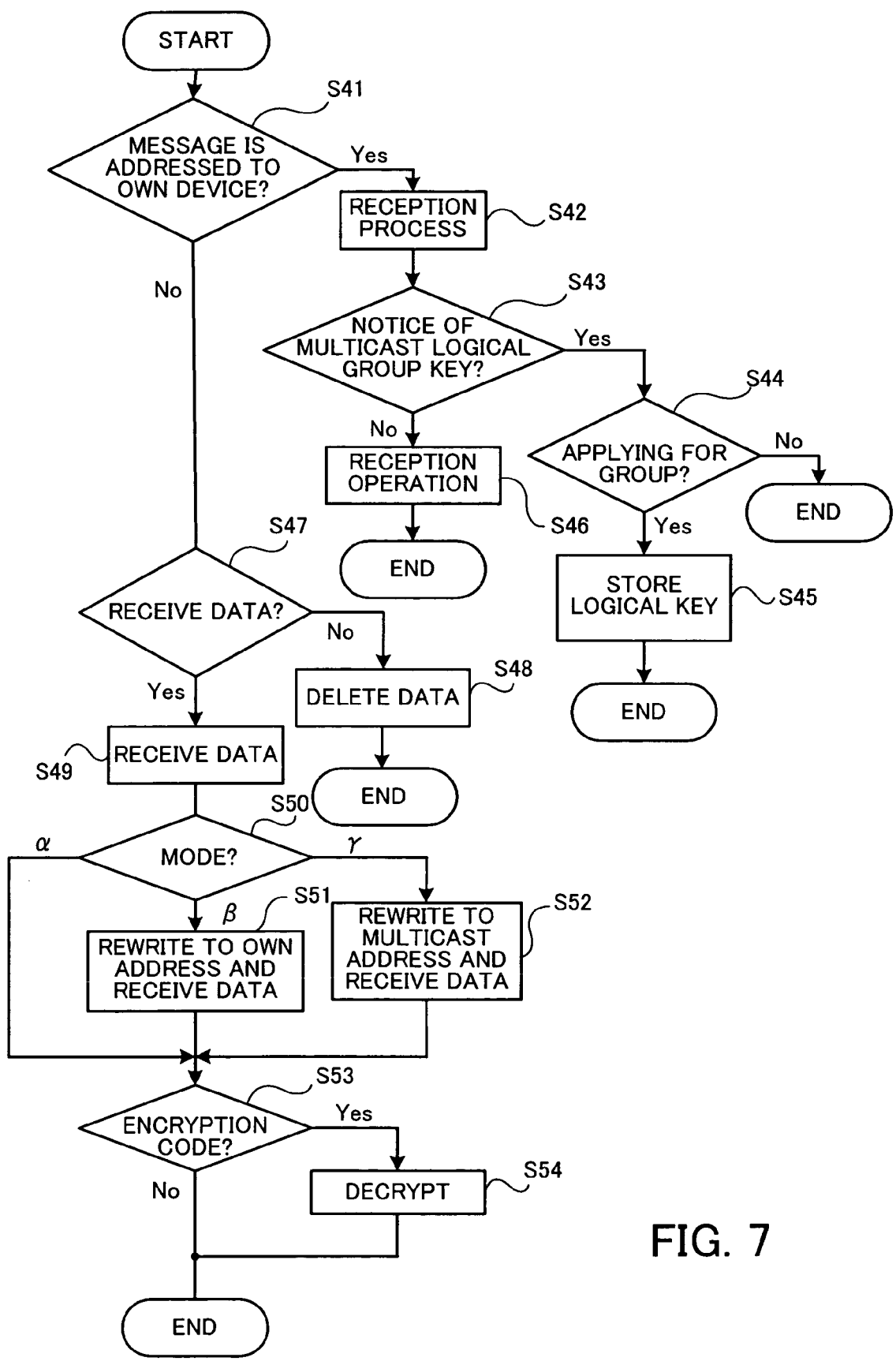

The operation of the communication device to receive a packet will be now described with reference to the flowchart of FIG. 7.

When the communication device 20, 20*a* detects (recognizes) a packet, it determines whether the packet is addressed to the own device (step S41). When this determination in step S41 results in Yes, the communication device 20, 20*a* receives the packet (step S42). Then, it is determined whether the received packet is a notification of a multicast logical group key (step S43). When this determination in step S43 results in Yes, it is determined whether the own device has applied for a group (step S44). When this determination in step S44 results in Yes, the communication device 20, 20*a* registers the multicast logical group key in the own management table (step S45). Then this packet reception process ends. When the determination in step S44 results in No, the communication device 20, 20*a* ends this process without any action. When the determination in step S43 results in No, the communication device 20, 20*a* receives the packet (step S46) and ends this packet reception process.

When the determination in step S41 results in No, the communication device 20, 20*a* determines whether to receive the packet (step S47). When this determination in step S47 results in No, the communication device deletes the detected packet (step S48), and ends this packet reception process. When the determination in step S47 results in Yes, the communication device proceeds to receive the packet (step S49). Then the mode of the packet is confirmed (step S50). The mode is a raw data mode (α of step S50), the process goes on to step S53. When the mode is a unicast mode (β of step S50), the destination address of the packet is overwritten to the own address (step S51). When the mode is a multicast mode (γ of step S50), the destination address of the packet is overwritten to a multicast address (step S52).

Then the communication device 20, 20*a* determines whether the received packet includes an encryption code (step S53). When this determination in step S53 results in Yes, the communication device decrypts the encrypted part of the data with the encryption code (step S54), and ends this message reception process. When the determination in step S53 results in No, the communication device ends this message reception process.

A specific operation of the group communication system will be described with reference to FIG. 8.

This figure shows a case where the communication devices 20 and 20*a* join a group G1 of the providing device 10 and perform group communication in this group G1.

Assume now that the IP address and the MAC address of the communication device 20 are IP_adr1 and MAC1:11 22 33 44 55 66, respectively. The IP address and the MAC address of the communication device 20*a* are IP_adr2 and MAC2:aa bb cc dd ee ff, respectively. The MAC address of the providing device 10 is MAC 3.

The communication device 20 transmits a packet P1 to the providing device 10 for enrollment of the group G1 (step S61).

Similarly, the communication device 20a transmits a packet P2 to the providing device 10 for enrollment of the group G1 (step S62).

Figure 8:
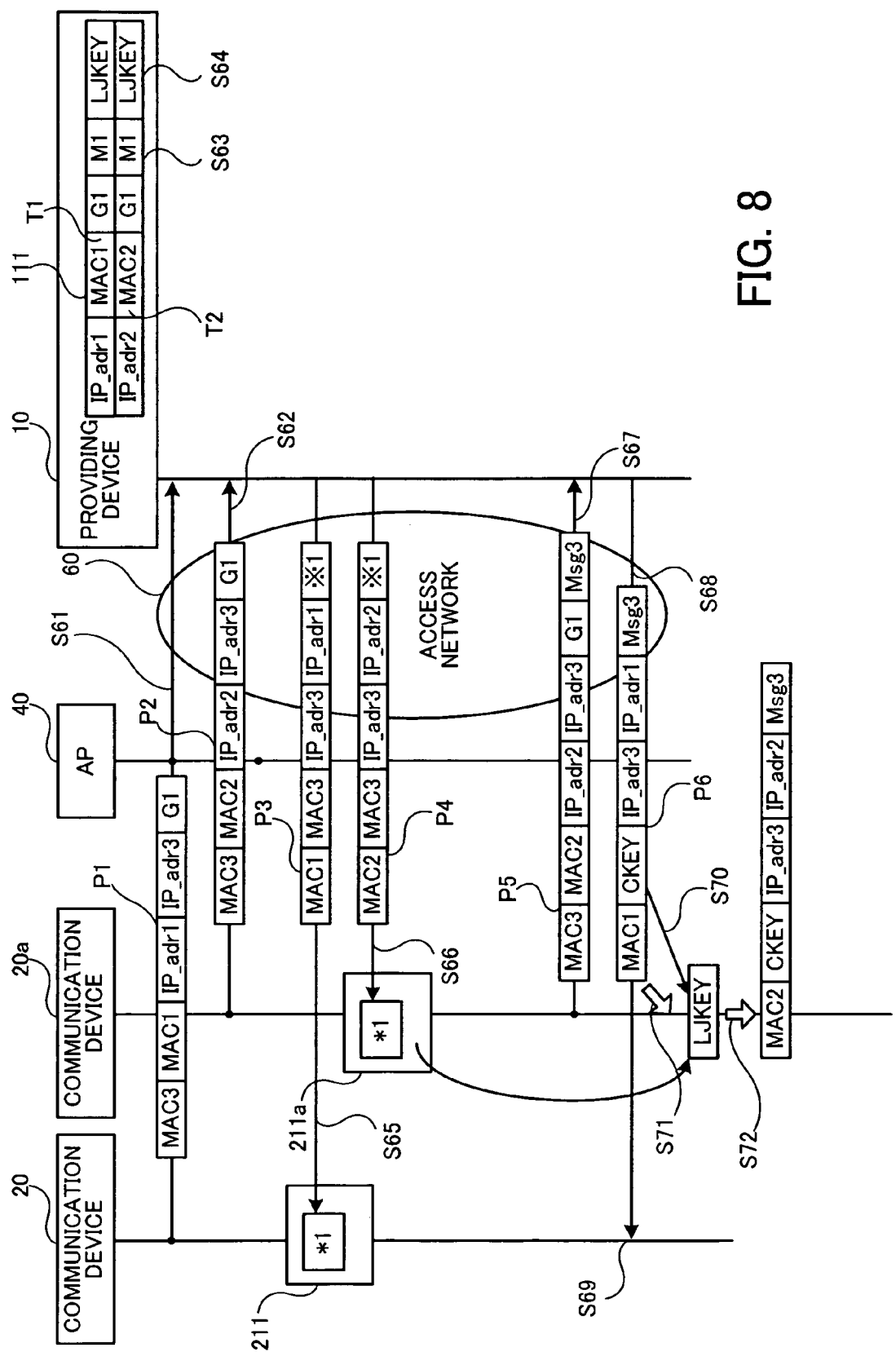

As shown in FIG. 8, each packet P1, P2 comprises a destination MAC address, a source MAC address, a source IP address, a destination IP address, and a group for enrollment in order.

When the providing device 10 recognizes that the communication devices 20 and 20a have the same prefix (AP 40), based on the IP addresses IP_adr1 and IP_adr2 of the communication devices 20 and 20a and the G1 information, the providing device 10 extracts the IP_adr1, MAC1 and G1 from the packet P1 and registers them in the management table 111 as table information T1 in association with one another. Similarly, the providing device 10 extracts the IP_adr2, MAC2 and G1 from the packet P2 and registers them in the management table 111 as table information T2 in association with one another.

Then the providing device 10 associates the table information T1 with the table information T2 as the same subgroup (logical group) M1 allowing mergeable (broadcast) communication (step S63).

Then the providing device 10 adds the logical key (hereinafter, referred to as LJKEY) to each of the table information T1 and T2 associated as M1 (step S64).

Then the providing device 10 creates packets P3 and P4 each including the multicast logical group key (shown by *1 in FIG. 8) having LJKEY, and sends them to the communication devices 20 and 20a (steps S65 and S66).

As shown in FIG. 8, each packet P3, P4 comprises a destination MAC address, a source MAC address, a source IP address, a destination IP address, and a multicast logical group key.

Figure 9:
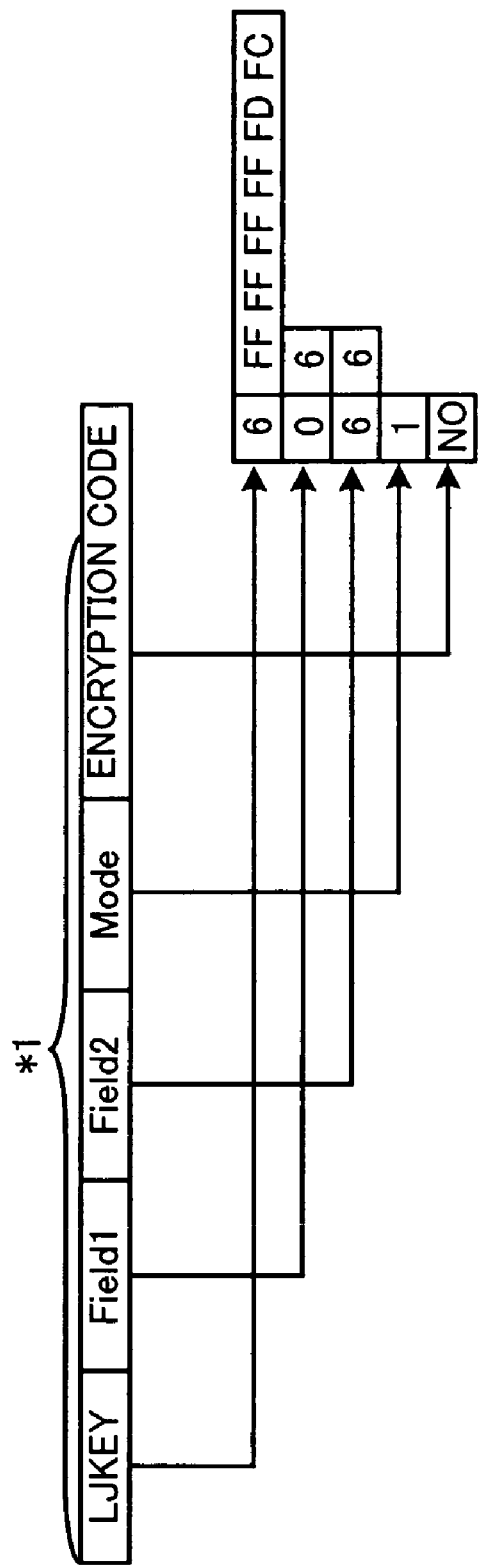

FIG. 9 shows the multicast logical group key of the group communication system of FIG. 8.

The multicast logical group key comprises fields for LJKEY, Field1 for transmission of distribution data, Field2 containing a value resulted from the exclusive OR operation of LJKEY and Field1, Mode specifying how to rewrite the destination of the distribution data when LJKEY is satisfied, and an encryption code that is information to decrypt the encryption of data when LKEY is satisfied.

In this embodiment, as an example, a packet-length of 6 bytes (FF FF FF FE FD FC) is set in the LJKEY field. In the Field1, a length of 6 bytes (11 22 33 44 55 66) is set from the first zeroth byte of the data. In the Field2, a length of 6 bytes (ee dd cc ba a8 98) is set from the sixth byte from the beginning of the data. In the Mode field, "1" (unicast mode) is set. In the encryption code field, "NO" is set. In this connection, in a case of a multicasting mode, "2" is set in this Mode field.

Referring back to FIG. 8, the communication device 20 receives the packet P3, and registers the multicast logical group key in the management table 211. Similarly, the communication device 20a receives the packet P4 and registers the multicast logical group key in to the management table 211a.

When the communication device 20a performs broadcast communication of a message Msg3 to the group G1, this device transmits the packet P5 to the providing device 10.

As shown in FIG. 8, the packet P5 comprises a destination MAC address, a source MAC address, a source IP address, a destination IP address, a group for the broadcast communication, and a message in order.

When the providing device 10 receives the packet P5, this device sets a destination communication device (main prefix address) with reference to the management table 111. This setting method is preferably a fixed-priority method or the Round-Robin method but is not limited to them. In the Round-Robin method, even when the main communication device leaves a group, a next destination can be determined easily.

FIG. 8 shows a case of setting the communication device 20 as a destination.

When the providing device 10 receives the packet P5, this device performs the exclusive OR operation of Field1 and LKEY, the Field1 sent to the communication device 20 in the packet P3 and being stored in the management table 211 of the communication device 20. Then the providing device 10 sends a packet P6 (distribution data) with CKEY resulted from the operation contained in the Field2, to the communication device 20 (step S68).

The communication device 20 recognizes the packet P6, confirms the destination and receives this packet (step S69). Then the communication device 20 gives the message Msg3 to the application section 26.

The communication device 20a also recognizes the packet P6, and determines whether to receive the packet P6 (step S70). Specifically, when the exclusive OR operation of Field1 and CKEY results in LJKEY or when the exclusive OR operation of Field1 and LJKEY results in CKEY, the packet P6 is identified as being addressed to the group G1. Therefore the communication device 20a receives the packet P6 (step S71). Then, in a case of mode 1 (unicast), the communication device 20a gives the message Msg3 to the application section 26a with the destination MAC address of the packet P6 rewritten to the own MAC address MAC2 (step S72) and the destination IP address rewritten to the own IP address.

This example shows the case of the unicast mode. In a case of the multicast mode, after reception of the packet P6, the communication device 20 rewrites the destination MAC address and the destination IP address of the packet P6 to the address of the group G1 and the multicast IP address, respectively.

According to the group communication system of this embodiment as described above, when the communication device 20, 20a transmits an enrollment message, the providing device 10 groups the communication devices belonging to the same network (router or access point) based on the connection formation of the network or the network prefix address information (into subgroup A), and after sending LJKEY as management data to the communication device sending the enrollment message, transmits to each subgroup a packet P6 together with information equivalent to a multicast address, so that the communication devices 20 and 20a can both receive the packet, like multicast communication. This technique can reduce the traffic volume by 1/n (½ in this embodiment), thus transmitting information to each subgroup with preventing excess network traffic.

Further, effective communication can be realized without additional functions provided on a network.

Still further, full duplex group communication can be realized since private information is not treated as broadcast information.

Still further, since data indicating an unreceivable condition can be set in Field2, general communication where data is sent to a specified communication device only can be realized.

Still further, this embodiment uses the communication device 20 as a destination. However, since a result of the exclusive OR operation of LJKEY and information in Field1 is set in Field2, data can be transmitted to any main address. That is, as shown in FIG. 8, since only CKEY is changed, a wide-area group communication can be performed, even for wireless LAN where a prefix varies, via some access points and networks.

Still further, this embodiment has described a case where the providing device 10 is provided, independently from the communication devices 20 and 20a via the access network 60. This embodiment, however, is not limited to this and one communication device 20, 20a can operate as the providing device 10 to manage the group G1. This can offer effective distribution even in an ad-hoc network. The ad-hoc network can perform half duplex distribution in such a manner that a communication device itself can transmit information to members. In addition, the communication device can receive information from the own device by transmitting the information to a deputy device.

Still further, an encryption mode is not specifically limited. A well-known encryption method of encrypting an entire packet P6 with an encryption code can be used.

Still further, although the packet P5 is data that is transmitted from the communication device 20a, this invention also can be applied to data traveling through the access network 60 from the providing device 20 to a group.

It should be noted that communication devices that belong to the same database, the same network address, or the same domain can be grouped into the same subgroup (logical group) M1.

The second embodiment of a group communication system will be now described with reference to FIG. 10.

Here only different configuration from the above-described first embodiment, that is the configuration of a communication device, will be described.

Figure 10:
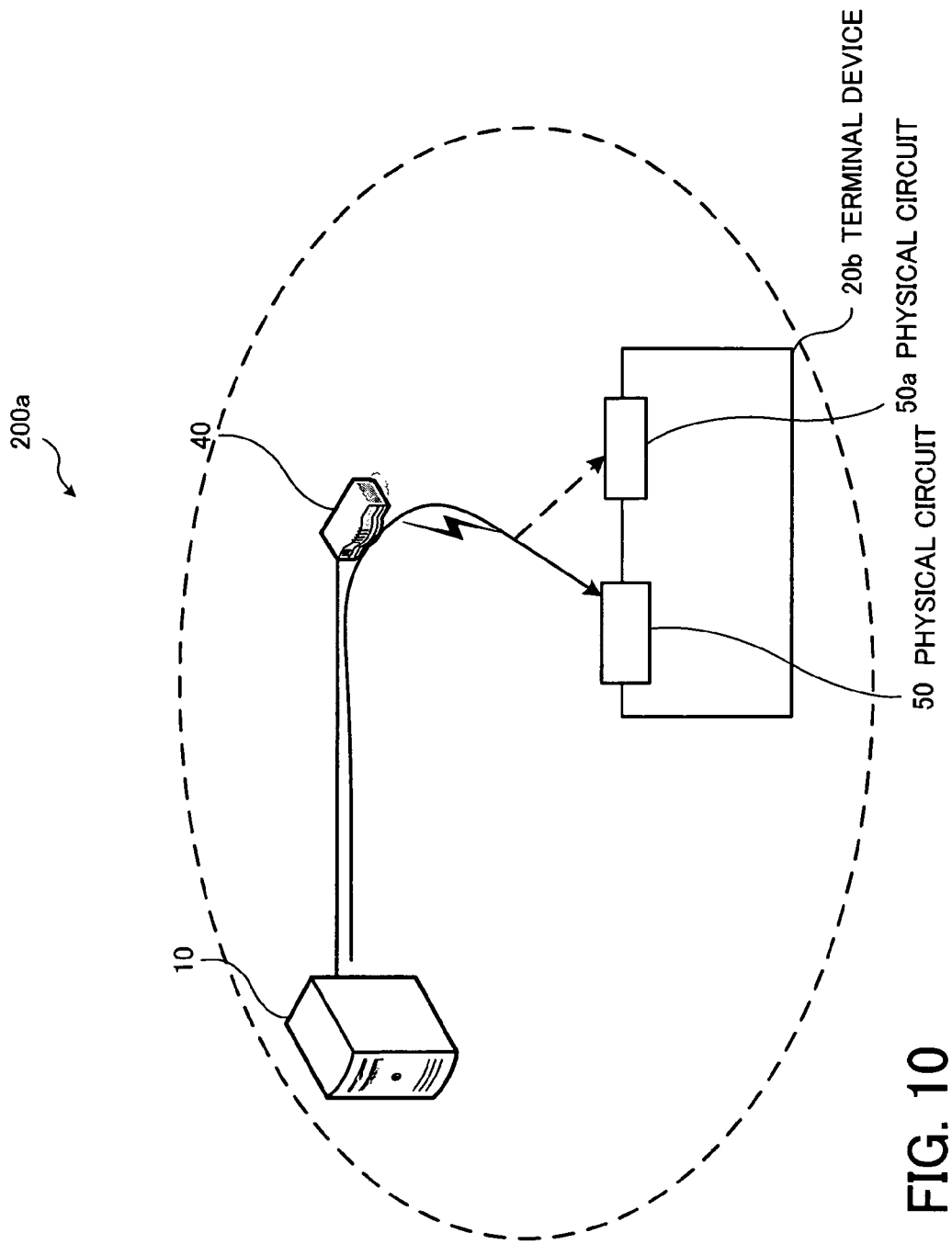

Referring to FIG. 10, a terminal device 20b has some (two in this embodiment) physical circuits 50 and 50a. The physical circuits 50 and 50a correspond to the communication devices 20 and 20a of the group communication system 200.

At the time of group communication, table information on each physical circuit 50, 50a is stored in a management table 111 of a providing device 10.

This group communication system 200a of this second embodiment can obtain the same effects as the group communication system 200 of the first embodiment.

In addition, according to the group communication system 200a of the second embodiment, since a packet from the providing device 10 can be received via the physical circuits 50 and 50a. Therefore, by providing each of the physical circuits 50 and 50a with a memory unit to store the packet received via the physical circuits 50 and 50a, the terminal device 20b can operate as a backup device.

The group communication method, the communication device and the management device according to this invention have been described with reference to the accompanying drawings. This invention is not limited to them and they can have other equivalent functions. In addition, other configurations and processes can be applied. Two or more configurations (features) of the above-described embodiments can be combined. For example, a group communication method according to one of the embodiments can be used for the subgroup A while communication using a multicast address can be used for the subgroup B.

According to this invention, the communication devices previously store a group key received from the providing device and the providing device performs only one transmission for each subgroup, thereby realizing service like multicast service. Therefore, the data transmission to a plurality of communication devices does not cause excessive network traffic.

In addition, effective communication can be realized without additional functions provided on a network.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A group communication method for realizing communication in a group including communication devices by using a management device managing the group, the method comprising:

receiving an enrollment message from at least two communication devices;

grouping the at least two communication devices transmitting the enrollment message;

creating a first group key including first data and second data, which specifies the at least two grouped communication devices as a same subgroup, based on address information of the at least communication devices included in the enrollment message;

transmitting the first group key to the at least two grouped communication devices of the same subgroup;

receiving the first group key at the grouped communication devices;

selecting a communication device of the at least two grouped communication devices as a destination of distribution data to receive the distribution data for the at least two grouped communication devices;

transmitting the distribution data including a MAC address of the selected communication device as a destination and a second group key including third data resulted from an exclusive OR operation of the first data and the second data, to the grouped communication devices including the selected communication device;

receiving the distribution data at the selected communication device;

recognizing the distribution data at the grouped communication devices except the selected communication device, each of which has a MAC address different from the MAC address included in the distribution data, and determining to receive the distribution data when a result of the exclusive OR operation of the first data and the second data included in the first group key matches the third data included in the second group key; and receiving, at the grouped communication devices except the selected communication device, the distribution data upon determining to receive the distinction data.

2. The group communication method according to claim 1, wherein the grouping groups the communication devices based on group information included in the enrollment message.

3. The group communication method according to claim 1, wherein the grouping groups the at least two communication devices in the same subgroup because the at least two communication devices belong to one of a same database, a same network address and a same domain.

4. The group communication method according to claim 1, further comprising selecting dynamically one of the grouped communication devices of the same subgroup when transmitting the distribution data to the same subgroup.

5. The group communication method according to claim 1, wherein the distribution data has at least an encrypted part.

6. The group communication method according to claim 1, wherein one of the communication devices operates as the management device.

7. The group communication method according to claim 1, wherein at least one of the grouped communication devices does not receive the distribution data when the distribution data includes another group key.

8. The group communication method according to claim 1, wherein a terminal device provided with at least two of the communication devices is provided.

9. A communication device included in communication group being managed by a management device, the communication device comprising:
a transmitter to transmit an enrollment message to join the communication group;
a storage unit to receive and store a first group key including first data and second data, which is created based on address information of the communication device included in the enrollment message and returned as a notification of being member of the communication group; and
a determination unit to recognize data which includes a MAC address of one communication device of the communication group as a destination and a second group key including third data resulted from an exclusive OR operation of the first data and the second data and is distributed to the communication group, to determine to receive the data when detecting that the MAC address included in the data is different from a MAC address of the communication device and that a result of the exclusive OR operation of the first data and the second data included in the first key matches the third data included in the second group key, and to receive the data upon determining to receive the data.

10. A management device for managing a communication group including a plurality of communication devices, the management device comprising:
a receiver to receive an enrollment message transmitted from each of the communication devices;
a management unit to manage the communication devices applying for the communication group into subgroups, to create a first group key including first data and second data, which specifies grouped communication devices identified as a same subgroup, based on address information of the communication devices included in the enrollment message, and to select at least one of the grouped communication devices of the same subgroup; and
a transmitter to transmit the first group key to the grouped communication devices of the same subgroup, and to transmit distribution data including a MAC address of the selected one of the grouped communication devices as a destination and a second group key including third data resulted from an exclusive OR operation of the first data and the second data to the grouped communication devices including the selected communication device, wherein the distribution data is recognized by the grouped communication devices of the same subgroup having MAC addresses different from the MAC address included in the distribution data and is received when a result of the exclusive OR operation of the first data and the second data included in the first group key matches the third data included in the second group key.

11. The method of claim 1, wherein the transmitting transmits the distribution data received by the at least two group communication devices to only the selected communication device.

12. A communication method for a communication device comprising:
transmitting an enrollment message to a management device to join a communication group;
receiving a first group key including first data and second data, which is created based on address information of the communication device included in the enrollment message, as a notification of being a member of the communication group;
storing the first group key;
recognizing distribution data including a MAC address of a selected one of the communication device as a destination and a second group key including third data resulted from an exclusive OR operation of the first data and the second data; and
receiving, at communication devices of the communication group which have MAC addresses different from the MAC address included in the distribution data, the distribution data when a result of the exclusive OR operation of the first data and the second data included in the first group key matches the third data included in the second group key.

13. The method of claim 12, wherein the distribution data is received from the other communication device.

14. The method of claim 12, further comprising:
receiving a message sent to another communication device and converting an address of the communication device to an address associated with the communication device; and
receiving the distribution data from the message having the converted address.

15. The method of claim 12, wherein the communication is not transmitted directly from the management device to the communication device.

* * * * *